United States Patent [19]
Kubala

[11] Patent Number: 5,669,636
[45] Date of Patent: Sep. 23, 1997

[54] FLOATING SEAL ASSEMBLY FOR A BEARINGLESS COOLANT UNION HAVING AIR ROTATION CAPABILITY

[75] Inventor: Zbigniew Kubala, Waukegan, Ill.

[73] Assignee: Deublin Company, Waukegan, Ill.

[21] Appl. No.: 509,766

[22] Filed: Aug. 1, 1995

[51] Int. Cl.⁶ .................................. F16L 17/02
[52] U.S. Cl. .................................. 285/98; 285/281
[58] Field of Search .................. 285/98, 41, 281, 285/279

[56] References Cited

U.S. PATENT DOCUMENTS

| | | | |
|---|---|---|---|
| 2,705,651 | 4/1955 | Myers | 285/281 |
| 3,002,769 | 10/1961 | Deubler et al. | 285/98 X |
| 4,296,952 | 10/1981 | McCracken | 285/98 |
| 4,976,282 | 12/1990 | Kubola | 285/98 X |

*Primary Examiner*—Dave W. Arola
*Attorney, Agent, or Firm*—Emrich & Dithmar

[57] ABSTRACT

A coupling device for providing a sealing arrangement with a rotating seal member includes a housing having a fluid coolant inlet, an air coolant inlet a passageway therethrough, and a seal shaft member having a seal member thereon and an axial bore therethrough positioned in said housing for axial sliding movement within the housing between an unpressurized position and a pressurized position. The seal shaft member, when in the pressurized position, provides a sealing arrangement between the rotating seal member and the shaft seal member. The coupling device further includes a first sealing assembly positioned between the engaging surfaces of the shaft member and the housing and structurally arranged to communicate with the air coolant inlet and a second sealing assembly positioned between the engaging surfaces of the shaft member and the housing and structurally arranged to communicate with said fluid coolant inlet. The first sealing assembly provides a seal between the movable shaft member and the housing when air coolant is directed into the housing and axially moves the shaft member to the pressurized condition. The second sealing assembly provides a seal between the movable shaft member and the housing when fluid coolant is directed into the housing and axially moves the shaft member to the pressurized condition.

14 Claims, 2 Drawing Sheets

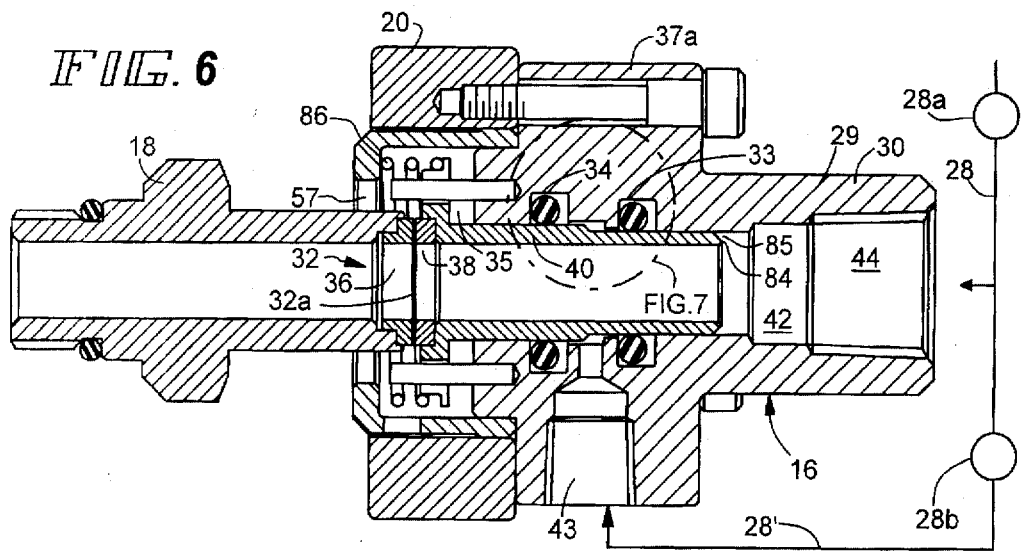
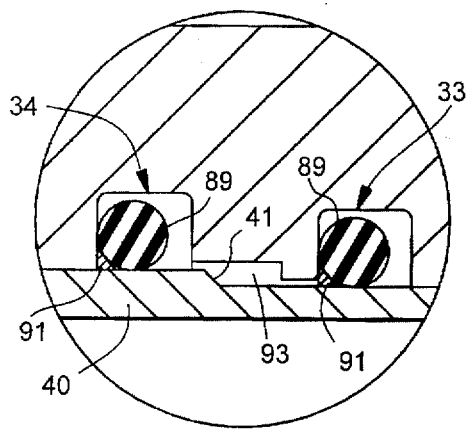
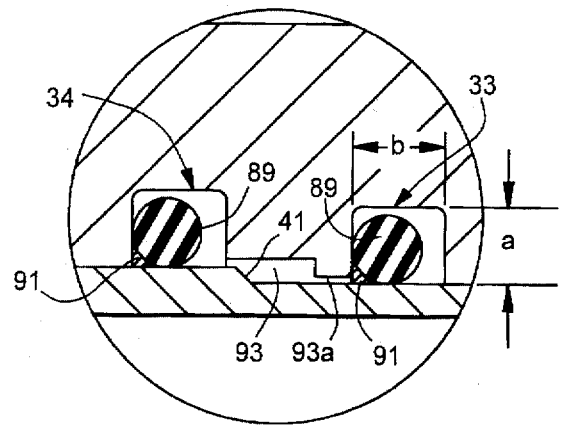
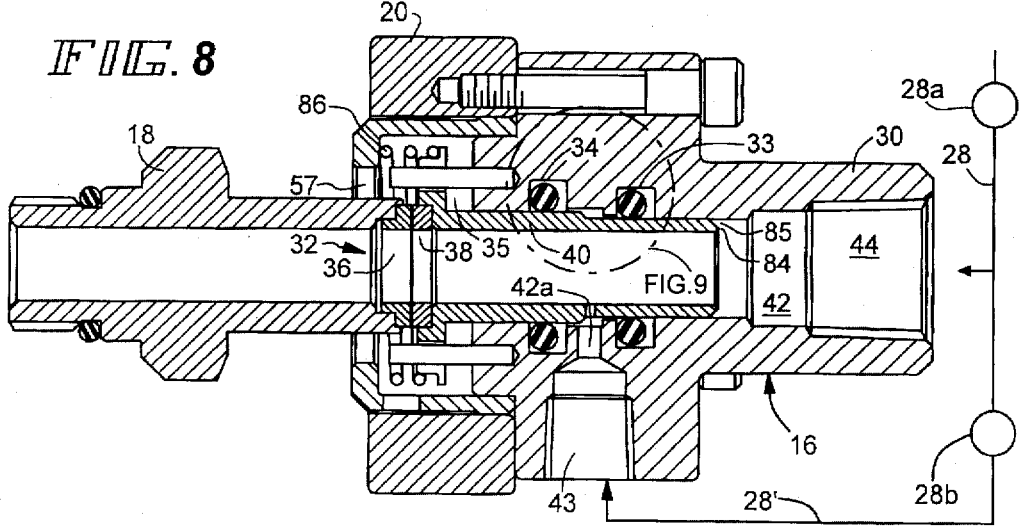

FLOATING SEAL ASSEMBLY FOR A BEARINGLESS COOLANT UNION HAVING AIR ROTATION CAPABILITY

BACKGROUND OF THE INVENTION

The present invention relates to fluid coupling devices such as coolant unions, and more particularly, to an improved sealing arrangement for coolant unions of the type having seal assemblies which are operable either with a fluid coolant source or an air coolant source.

Fluid coupling devices such as rotating unions are used extensively in high speed drilling and boring transfer operations, in high speed machine tool spindles, in clutch and brake operations, and in other applications where it is necessary to couple the outlet of fluid sources to rotating devices. To intensify the conditions of high speed machine tools, rotating unions are required to conduct either a liquid, such as a water based coolant, or an air coolant, from a source of the particular coolant to the rotating machine tool. Each of these types of rotating coolant unions include a sealing assembly which provides the interface between the outlet of either the fluid or air coolant source which is fixed and the rotating device to which coolant is being supplied. In each type of coupling device, the seal assembly includes a rotating seal member that is mounted on the rotor of the rotating union and a non-rotating seal member that is mounted within the housing of the coolant union. In an air coolant type coupling device, the seal surface of the non-rotating seal member is biased into air tight engagement with the seal surface of the rotating seal, typically by a bellows arrangement. The air coolant passing through the coolant union lubricates the seal member to minimize wear. In the fluid coolant type coupling device, the seal surface of the non-rotating seal member is biased into fluid tight engagement with the seal surface of the rotating seal, generally by a bias spring arrangement. The fluid coolant lubricates the seal members to minimize wear. However, when either fluid or air coolant is not provided, a condition referred to in the art as "dry running," occurs because the interfacing surfaces of the seal members do not receive lubrication. Dry running results in increased wear on the seal surfaces of the seal members, particularly at high speed operation, and extended dry run operation will cause scoring of the seal faces, particularly the seal face of the rotating seal member, resulting in leakage around the seal faces which will require replacement of one or both of the seal members. Because the rotating seal member is either permanently attached to the rotor or is integrally formed with the rotor, replacement of a damaged or scored rotating seal member requires replacement of the entire rotor assembly.

To solve seal wear problems associated with dry running, rotating coolant unions have been developed in which the rotating seal member is automatically disengaged from the non-rotating seal member in the absence of liquid or air coolant. Such coolant unions are commonly referred to as "pop-off" unions because the fixed seal member is moved axially relative to the housing of the coolant union out of engagement with the rotating seal member when coolant flow pressure decreases below a selected or predetermined value. The non-rotating seal member is mounted on a carrier that is adapted to be moved to carry the seal member into engagement with the rotating seal member when coolant flow pressure is increased to the selected value.

Because "pop-off" type unions require axial movement of one seal member along the inner surface of the housing of the union, sealing must be provided to prevent leakage forwardly past the axially movable seal member through the gap between the seal member carrier and the housing inner surface on which it slides. Generally, in such fluid or air coolant unions, such sealing is provided by an O-ring seal located in an annular groove in the inner surface of the housing and which engages the outer surface of the carrier for the non-rotating seal member about its circumference. However, because the O-ring seal is fixed in an annular groove in the housing, as the carrier moves the non-rotating seal member, the seal is dragged along the outer surface of the carrier. The resultant wear on the O-ring seal will cause the O-ring seal to fail, permitting forward flow of the liquid coolant from the inlet of the union into the interior of the housing.

Another example of a "pop-off" type coolant union including a fluid or air actuated seal assembly is disclosed in U.S. Pat. No. 4,976,282 which was issued to Zbigniew Kubala and which is assigned to Deublin Company of Northbrook, Ill. This type coolant union includes a diaphragm in the fluid path for driving the non-rotating seal member into engagement with the rotating seal member when liquid coolant is being supplied to the coolant union. A bias mechanism drives the seal members apart in the absence of liquid coolant. Also, this type rotating union may be air coolant driven. When sufficient fluid or air coolant pressure is provided, pressure on the diaphragm causes the diaphragm to move the seal member carrier axially to drive the non-rotating seal member into engagement with the rotating seal member. In these types of coolant unions, the diaphragm provides sealing against coolant leakage forwardly of the housing. However, the use of the diaphragm for actuating the seal assembly increases the cost and complexity of such coolant unions.

Moreover, such "pop-off" type coolant unions have not been designed to be selectively operable either from a fluid coolant source or an air coolant source, as desired. Accordingly, depending upon the speed of the driven machine tool spindles, the user of such machine tool spindles must utilize two distinct and separate coolant unions, one utilizing a fluid coolant source and one utilizing an air coolant source, an expensive and time consuming matter.

SUMMARY OF THE INVENTION

The present invention provides a novel sealing arrangement for a coupling device which selectively utilizes either fluid coolant or air coolant by substantially preventing leakage forward between a portion of a seal structure of the coupling device that is adapted for axial sliding movement within a passageway of a housing of the coupling device and the inner wall of the housing along which the portion of the seal assembly slides. The sealing arrangement or structure of the present invention includes a second sealing assembly consisting of a second annular seal member and a back-up ring located in a second annular groove located forwardly of the fluid inlet port and defined in the inner wall of the housing. The second annular seal member engages an outer surface of the movable portion of the seal structure. The sealing arrangement or structure of the present invention further includes a first sealing assembly consisting of a first annular seal member and a back-up ring located in a first annular groove located forwardly of the air inlet port and defined in the inner wall of the housing. The first annular seal member engages an outer surface of the movable portion of the seal structure. In accordance with a feature of the present invention, the first and second annular seal members are each sized to be smaller than the first and second annular grooves, respectively, thereby allowing limited movement of the seal members within the grooves. The back-up rings each encircle the moving seal assembly and are positioned within the respective annular grooves in the inner wall of the housing. The back-up rings are oriented within each of the grooves to provide a slanting surface for a corner of groove facing the annular seal member. The slanting surface of the back-up ring is engaged by either the first or second annular seal members resulting from the axial movement of the movable portion of the seal assembly, to thereby limit the movement of the annular seal member within the groove, as will hereafter be described. Consequently, the annular seal member in either groove is not dragged along the surface of the moving seal assembly or sliding support member into the gap between the inner wall of the housing and the outer surface of the moving seal assembly. Accordingly, wear on the annular seal member is minimized, thus increasing the lifetime of the annular seal member.

The novel sealing arrangement or structure provided by the present invention is particularly suitable for application to rotating unions having both a second fluid actuated seal assembly and a first air actuated seal assembly in which the floating seal assembly, which is located within the housing of the union, provides a rotating seal between either the fluid inlet or air inlet of the union and a discharge passageway of the rotor, as desired. The floating seal structure is adapted to be selectively actuated either by a fluid coolant or an air coolant introduced into the inlet chamber for acting upon the non-rotating seal member to maintain it at the first position, in the absence of a selected fluid or air flow pressure in the inlet chamber, and to move the non-rotating seal to a second position and maintain it in the second position as long as fluid or air flow pressure is provided into the inlet chamber. In such an application, the sealing arrangement substantially prevents leakage between the engaging surface of the housing and the axially movable carrier that moves the non-rotating seal member into and out of engagement with the rotating seal member.

Additionally, in accordance with the present invention the first or second annular seal members or O-rings are structurally arranged to sealingly engage the outer annular surface of the movable carrier portion of the seal assembly and to float within the annular grooves provided in the inner wall of the housing. Thus, as thermal expansion effects the preset opening distance between the rotating and non-rotating seal faces, the O-ring never rolls on the movable carrier portion of the seal assembly but instead is allowed to slide or float therealong within the respective annular groove to provide an automatic adjustment for spindle expansion and to provide and maintain the preset opening distance and avoid contact during a dry running condition.

The present invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWING

For the purpose of facilitating and understanding the present invention, there is illustrated in the accompanying drawings a preferred embodiment thereof, from an inspection of which, when considered in connection with the following description, the invention, its construction and operation, and many of its advantages will be readily understood and appreciated.

FIG. 6 is a vertical section view of the rotating coolant union in accordance with the present invention illustrating the positioning of the first and second sealing assemblies when air coolant is introduced into the coolant union and the coolant union is in its operated, pressurized condition;

FIG. 7 is an enlarged view of the portion of the rotating coolant union shown in the circle of FIG. 6, illustrating the relationship of the first and second sealing assemblies and the back-up rings when air coolant is introduced into the rotating union and the rotating coolant union in its operated, pressurized condition;

FIG. 8 is a vertical section view of the rotating coolant union in accordance with the present invention illustrating the positioning of the first and second sealing assemblies when liquid coolant is introduced into the coolant union and the coolant union is in its operated, pressurized condition; and FIG. 9 is an enlarged view of the portion of the rotating coolant union shown in the circle of FIG. 8, illustrating the positioning of the first and second sealing assemblies when liquid coolant is introduced into the coolant union and the coolant union is in its operated, pressurized condition.

DESCRIPTION OF THE PREFERRED EMBODIMENT

Figure 1:
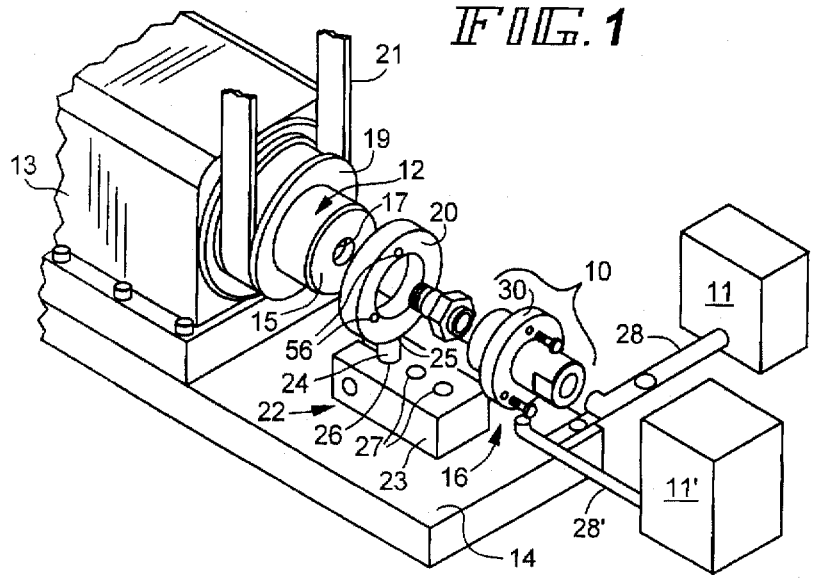
FIG. 1 illustrates a rotating coolant union, operable either with a fluid coolant source or an air coolant source, shown partially exploded, incorporating the novel sealing arrangement in accordance with the present invention, the coolant union being externally supported in operative relation with a rotating shaft of an apparatus for coupling the outlet of a coolant source to the rotating shaft.

Referring now to FIG. 1 of the drawings, there is illustrated a rotating coolant union 10 incorporating the improved sealing arrangement provided in accordance with the present invention. The rotating coolant union 10, shown partially exploded in FIG. 1, is used to conduct a coolant, either in a liquid or gaseous state, from a source of coolant to a drive shaft 12 of a device, such as a rotating drill bit (not shown), to which either the liquid or gaseous coolant is to be supplied. The rotating coolant union 10 interfaces the outlet of the source of coolant and the shaft 12 to which the rotating device is connected. The shaft 12 is supported in a spindle box 13 which is fixedly mounted on a support plate 14. The driven end 15 of the shaft 12 extends out of the spindle box 13. The shaft 12 has a bore 17 formed therethrough for conducting either the liquid or air coolant to the rotating device. The driven end of the shaft 12 carries a pulley 19 which facilitates rotation of the shaft by a motor driven belt 21.

The rotating coolant union 10 includes a cartridge union 16, a stub rotor 18 and a union adapter 20. The stub rotor 18 is connected to the rotating shaft 12 which is to receive coolant medium through the coolant union. The stub rotor 18 is driven by the driving element to which it is coupled and is revolving at a rate determined by the driving element of up to 20,000 RPM or greater.

In the exemplary embodiment, the rotary union 10 is externally supported, the stub rotor 18 being mounted onto the end of the shaft 12, and the cartridge union 16 being rigidly mounted by means of the union adapter 20 to the support plate 14. The support plate 14 defines a stationary mounting surface for permitting the cartridge union 16 to be maintained in axial alignment with the stub rotor 18, allowing precise engagement of seal faces of a non-rotating seal member and a rotating seal member of the rotating union, as will be hereinafter be described. A base mount clamp assembly 22, including a mounting base 23 and a mounting post 24, mounts the union adapter 20 to the support plate 14. The mounting base 23 is affixed to the support plate 14. The union adapter 20 has a tapped hole (not shown) on its lower surface which receives end 25 of the mounting post 24. The other end 26 of the mounting post is received in one of a plurality of tapped holes 27 formed in the upper surface of the mounting base 23. The plurality of mounting holes 27 in the mounting base 23 enables the base mount clamp assembly 22 to accommodate rotating unions of different sizes and dimensions.

The mounting arrangement illustrated in FIG. 1 is a standard base mount configuration in which the union adapter 20 is held by the base mount clamp assembly 22. Alternatively, the rotary coolant union may be top supported or the rotary coolant union may be self-supporting, as is known in the art. In a top supported mounting arrangement, the union adapter is suspended from a clamping mechanism mounted to the upper surface of the spindle box for maintaining the union cartridge in axial alignment with the stub rotor. Self-supporting unions include a bearing mechanism, such as one or more roller bearings, for supporting unions include a bearing mechanism, such as one or more roller bearings, for supporting and aligning the stub rotor 18 relative to the housing of the coolant union to maintain the rotating seal member aligned axially with the non-rotating seal member.

Figure 2:
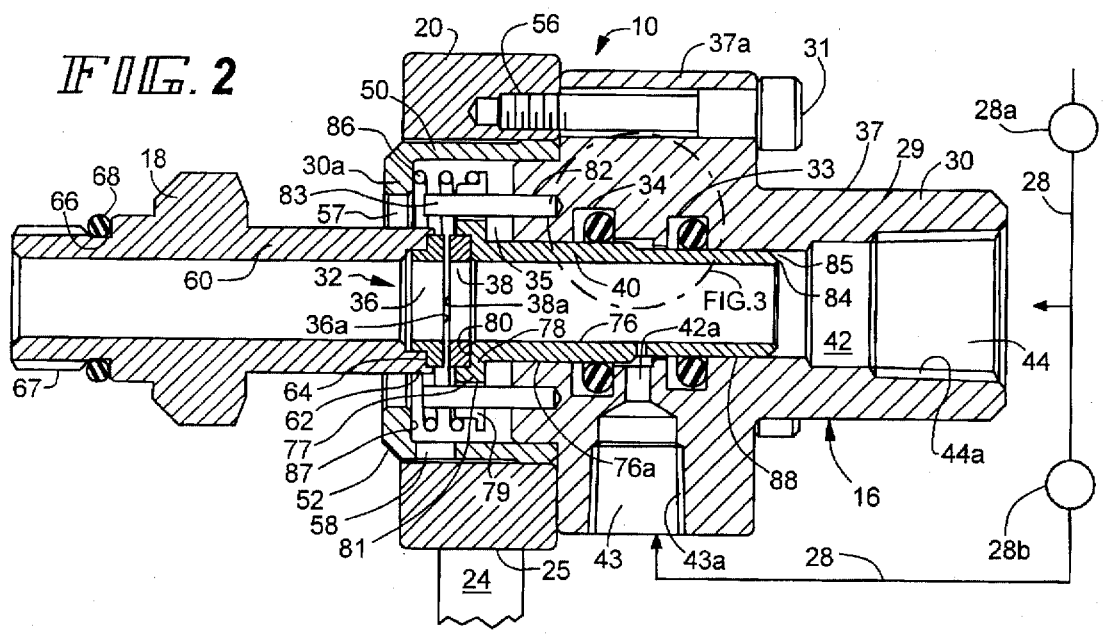
FIG. 2 is a vertical section view of the rotating coolant union provided in accordance with the present invention, with the coolant union shown in its unoperated, unpressurized condition.
Figure 4:
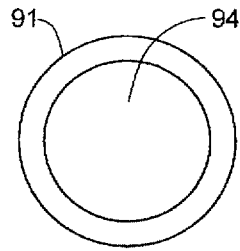
FIG. 4 is a plan view of the back-up ring of the rotating coolant union in accordance with the present invention.
Figure 3:
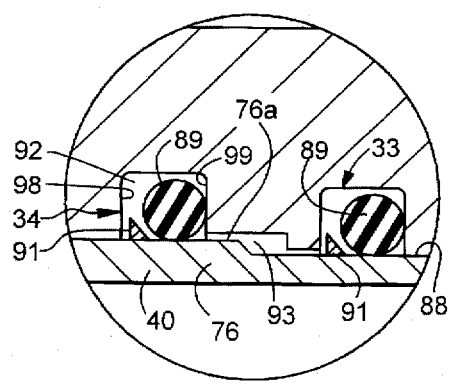
FIG. 3 is an enlarged view of the portion of the rotating coolant union shown in the circle in FIG. 2, illustrating the relationship between the first and second sealing assemblies and the back-up rings when the rotating coolant union is in its unoperated, unpressurized condition.

Referring now to FIGS. 1–3, the cartridge union 16 in accordance with the present invention includes an end cap 30, a floating seal assembly 32, a first sealing assembly 33 and a second sealing assembly 34. The end cap 30 and the union adapter 20 form a cylindrical housing for the rotating union, the housing being given the reference numeral 29. The interior of the housing 29 defines a seal chamber 35 which locates the floating seal assembly 32.

The end cap 30 has a sidewall 37 with an annular mounting flange 37a by which the end is secured to the union adapter by suitable fasteners, such as cap screws 31. The end cap housing 30 has a cylindrical bore 42 which defines a passageway that extends axially of the end cap and which defines a air pressure inlet port 44 which is in line with the passageway. The air pressure inlet port 44 is adapted for connection to a supply conduit 28, shown in FIG. 1, for connecting with the outlet of a source 11 of air pressure. The supply conduit includes two check valves 28a and 28b on opposite sides of the inlet port 44. When air pressure is supplied to the cartridge union 16, check value 28a is open and check valve 28b in closed to cause the air pressure to pass through the inlet port 44 and through bore 42 to energize the first sealing assembly 33, as will hereinafter be discussed. The inner surface 44a of the portion of the end cap housing that defines the air pressure inlet port 44 can be internally threaded to facilitate connection to the supply conduit 28, shown in FIG. 1. Although the exemplary coolant union is a straight coolant union having the axis of the fluid inlet 44 aligned with the axis of the throughbore or passageway 42, the fluid inlet 44 may be oriented at a right angle to the throughbore.

The end cap housing 30 is additionally provided with a fluid inlet port 43 formed therein and extending radially of the housing 29 from the outer surface towards the center axis of the housing about the outer surface 76a of the carrier sidewall 76. The fluid inlet port 43 is adapted for connection via conduit 28' to a source 11' of liquid coolant and the inlet port 44 is adapted to connection via conduit 28 and check valve 28b to the source of liquid coolant. When liquid coolant pressure is supplied to the cartridge union 16, check valve 28b is open and check valve 28a is closed to permit the liquid coolant pressure to enter the cartridge union 16 through both inlet ports 43 and 44. The inner surface 43a of the fluid inlet port 43 may be internally threaded to facilitate connection to the supply conduit 28', as shown in FIG. 1.

The housing 29 includes a cup-shaped adapter member 30a press fitted to its forward end. The cup-shaped member 30a includes a cylindrical sidewall portion 50 with an end wall 52 at one end 53. The donut shaped union adapter 20 is adapted to receive the adapter member 30a and includes tapped apertures 56, shown in FIGS. 1 and 2, to facilitate connecting the union adapter 20 to the end cap 30 by means of the cap screws 31. The adapter member 30a has an axial opening 57 in its end wall 52 for the stub rotor 18 to pass through. The adapter member 30 has three vent holes, such as vent hole 58, formed through the sidewall 50 thereof adjacent to the seal chamber 35 and spaced apart equidistantly around the circumference of the adapter member 30. These vent holes enable liquid coolant to be conducted from the seal chamber 35 to the outside of the union housing when the seal provided by the mating sealing member begins to wear. Such liquid coolant leakage provides an early indication of seal wear and prevents fluid build up within the seal compartment. In embodiments of the present invention, adapter member 30a is made of aluminum.

The stub rotor 18 has a steel barrel 60 one end 62 of which is formed with a cavity 64. The stub rotor 18 has a circumferential groove 66 near its opposite end 67 which locates a VITON O-ring seal 68 for providing sealing between the stub rotor 18 and the inner surface of the shaft 12.

The floating seal assembly 32 includes a one-piece rotating seal member 36, made of silicon carbide, mounted to the cavity 64 of the stub rotor 18. The rotating seal member 36 includes a generally flat, disc-shaped seal portion 70 with an opening 71 through the center thereof, defining an annular seal surface 36a and a cylindrical mounting portion 72. The rotating seal member is mounted on the stub rotor 18 with its mounting portion 72 received in the cavity 64 formed in end 62 of the barrel 60 of the stub rotor 18. The rotating seal member 36 is secured to the stub rotor 18 in a suitable manner, as is known in the art.

The non-rotating seal member 38 is a generally flat, disc-shaped member that is made of silicon carbide. The non-rotating seal member 38 has an opening 39 through the center thereof defining an annular seal surface 38a corresponding in size and shape to annular seal surface 36a. The interfacing seal surfaces 36a and 38a of the seal members are lap ground to define closely fitting surfaces when the seal surfaces of the two seal members are engaged in abutting relationship during operation of the coolant union under liquid coolant pressure and minutely spaced apart during operation of coolant union under air pressure.

The non-rotating seal member 38 is mounted on and secured to a carrier 40. The carrier 40 is a generally hollow cylindrical sleeve-shaped member having a sidewall portion 76 with a flange 77 at one end 78 formed with an annular shoulder 79. The carrier 40 is countersunk at its one end 78 which defines a recess 80 which locates the seal member 38. A plurality of key slots 81 are defined along the periphery of the carrier. The key slots are aligned with corresponding apertures 82 in the end cap 30. Roll pins 83 pass through the key slots and into the apertures to index the seal member carrier 40 to the end cap 30 for preventing rotation of the carrier 40, and the seal member 38 carried thereby, relative to the end cap 30 when the seal member 38 is in engaged by the rotating seal member 36.

The end of the carrier 40 at its opposite end 84 is bevelled radially outwardly, defining an annular trough or channel 85 between the circumferential end 84 of the carrier 40 and the inner surface 37b of the side wall 37 of the end cap. The non-rotating seal member 38 and the carrier 40 are dimensioned, mounted and aligned with the axis of the passageway 42 so as to be capable of sliding axial motion within the passageway toward and away from the rotating seal member 36 on the stub rotor 18.

For the purpose of maintaining the non-rotating seal member 38 out of engagement with the rotating seal member 36 in the absence of coolant pressure, a compression spring 86, embodied as a coil spring, is located in the seal chamber 35. The compression spring encircles the stub rotor 18 and the carrier 40 and is located between the annular shoulder 79 of the carrier and the inner surface 87 of the end wall 52 of the union adapter 20. The force of the compression spring is transmitted rearwardly, to the right in FIG. 2, against the end 78 of the carrier 40 to disengage the seal members 36 and 38 when the embodiment of the rotating coolant union are in their unoperated, unpressurized condition. In the exemplary embodiments, the compression spring is made of stainless steel.

The novel sealing arrangement or structure provided in accordance with the embodiment of the present invention prevents leakage from the floating seal 32 along the carrier 40 through the gap 88 between the outer surface 76a of the carrier side wall 76 and the inner surface 37b of the end cap into the seal chamber. The sealing arrangement or structure preferably includes a second sealing assembly 34 consisting of a annular seal member 89 and a back-up ring 91 located in a annular groove 92 located forwardly of the fluid inlet port 43 and defined in the inner annular wall of the housing 30. The fluid inlet port 43 exits through opening 42a and communicates with an annular passageway 93 located about the outer surface 76a of the carrier side wall 76 which communicates with the first annular groove 92. The sealing arrangement or structure includes a first sealing assembly 33 consisting of an annular seal member 89 and a back-up ring 91 located in an annular groove 92 located forwardly of the air pressure inlet port 44 and defined in the inner annular wall of the housing 30. A gap passageway 93a communicates between the annular passageway 93 and the annular groove 92 of the first sealing assembly 33 to balance the pressure on the annular seal member 89 of the first sealing assembly.

Figure 5:
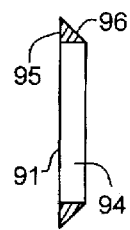
FIG. 5 is a side view of the back-up ring of the rotating coolant union in accordance with the present invention.

Referring again to FIGS. 2–5, the back-up ring 91 is an annular member made of a rigid material, such as NYLON. The back-up ring 91 has a generally triangular cross-section, as shown in FIG. 5. The back-up ring has an opening 94, the inner diameter of which corresponds to the outer diameter 76a of the carrier 40. The back-up ring has an annular rear surface 95 and a annular forward slanting surface 94 that slopes or slants radially outwardly from edge 95 of the opening 94 to the peripheral edge 97 of its rear surface 93. The back-up ring 91 is mounted on the carrier 40, extending around the circumference of the carrier, with its slanting surface extending into the annular grooves 92.

In the exemplary embodiment of the present invention, the annular grooves 92, which are generally rectangular in shape, have a radial dimension "a" of approximately 5.5 millimeters between the outer surface 76a of the carrier side wall 76 and the outer wall 100 of the annular groove 92 and a circumferential dimension "b" of approximately 6 millimeters between opposing parallel extending end walls 98 and 99 of the groove 91, best shown in FIGS. 3 and 9. Thus, the axial length and depth of each of the grooves 91 is greater than the diameter of the O-ring 89, which is generally of a diameter of approximately 5 millimeters. As shown in FIGS. 3, 7 and 9, the O-ring seals 89 are dimensionally smaller than the annular grooves 92, allowing the O-ring seals to float within the grooves 92 as the carrier 40 is moved axially forwardly, in moving the non-rotating seal member into engagement with the rotating seal member, and axially backwardly, in moving the non-rotating seal member out of engagement with the rotating seal member. The annular sealing member 89 is commercially available as a VITON O-ring.

Importantly, the back-up rings 91 each encircle the moving seal assembly, carrier 40, and are positioned within the respective annular grooves 92 in the inner wall of the housing. The back-up rings are oriented within each of the grooves to provide a slanting surface for a corner of groove facing the floating seal assembly 32. The slanting surface 96 of the back-up ring is engaged by O-ring 89 during the axial movement of the movable portion carrier 40, of the floating seal assembly, thereby limiting the movement of the annular seal member or O-ring 89 within the respective groove. Consequently, the annular seal member 89 in either groove is not dragged along the surface of the moving seal assembly or carrier 40 into the gap 88 between the inner wall of the housing 30 and the outer surface of the moving seal assembly 40 so that wear on the annular seal member 89 is minimized, thus increasing the lifetime of the annular seal member.

Referring to the embodiments of FIGS. 1–9, when coolant is supplied through the coolant union 10 to a device, such as a high speed machine tool, connected to and rotated by the shaft 12, the coolant union may be operatively connected either to the supply conduit 28 to a source 11 for air coolant under pressure, which is conducted or directed through air inlet port 44 to the rotating union because check valve 28a is open and check valve 28b is closed, or to the supply conduit 28' to a source 11' of liquid coolant under pressure which is conducted through fluid inlet ports 43 and 44 to the rotating union because check valve 28 is open and check valve 28a is closed.

Initially, as shown in FIGS. 2 and 3, the non-rotating seal member 38 is maintained out of engagement with the rotating seal member 36 by the force of the restoring spring 86, the position wherein the union 10 is in the unoperated, unpressurized and at the at rest condition or position. In such a position, the O-ring seals 89 and the back-up rings 91 are, preferably, located in contact with the one another, away from forward side walls 98 of the grooves 91, as shown in FIG. 3. When air pressure coolant is supplied through conduit 28 past open check valve 28a against closed check valve 28b, the air flow pressure is directed to the air pressure inlet port 44, and, thus, flows into the passageway 42. A portion of the air pressurized coolant is directed against the peripheral edge 84 of the carrier 40, entering the trough 85, thereby applying a force to the carrier 40. When the flow pressure of the air coolant becomes sufficient to overcome the bias force of the compression spring 86, the carrier 40 is moved by the force of the air coolant flow to the operated or pressurized condition, i.e., to the left in FIGS. 6 and 7, thereby, moving the non-rotating seal member 38 substantially into engagement with the rotating seal member 36, as illustrated in FIG. 6. However, in such operated, pressurized condition or position, the balance ratio between the air movable carrier 40 and associated moving sealing assembly allows a gap or separation 32a of approximately 1 to 3 microns between the rotating seal member 36 and the non-rotating seal member 38, as shown in FIG. 6. The minute gap or separation is sufficient to prevent the dry running condition while substantially providing a seal between the rotating seal member 36 and the non-rotating seal member 38.

Accordingly, when in the operated, pressurized condition, the air coolant flows through the passageway 42 in the end cap 30, through the contacting seal members 36 and 38 of the floating seal assembly 32 and through the bore 17 in the stub rotor 18 to the rotating device to which the air coolant is to be supplied. As shown in FIG. 7, when the carrier 40 is moved to the operated engaging position, the O-ring seal 89 is moved into engagement with the slanting surface 96 of the back-up ring 91 and with the forward side wall 98 of the annular groove 91 of the second sealing assembly 33. The triangular shaped back-up ring 91 fills the space in the corner between the circular cross-sectioned O-seal ring 89 and the right angle adjacent side walls 98 and outer surface 76a of the carrier side wall 76 within the groove 91 to provide a sealing arrangement. Although the O-ring seal 89 of the second sealing assembly 34 is also axially moved to engage the forward side wall 98 of the annular groove, the primary sealing structure is provided by the first sealing assembly 33 when air is directed through inlet 44.

The gap 32a between the non-rotating seal member 38 and the rotating seal member 36 is maintained as long as the air flow pressure is directed through the coolant union. When the air pressure decreases to a value which is insufficient to overcome the force of the compression spring 86, the carrier 40 is axially moved under the force of the compression spring thereby moving the non-rotating seal member 38 away from the approximately 1–5 micron gap engagement with the rotating seal member 36, returning its coolant union to the unoperated, unpressurized condition, the position as shown in FIGS. 2 and 3. The O-ring seal member 89 is moved by the carrier back towards the rearward side wall 99, the position as shown in FIG. 3. Although FIG. 3 illustrates the O-ring seal member 89 engaging rearward side wall 99 in each of the annular grooves 92, the O-ring seal members may be positioned intermediate the side walls 98 and 99, as desired, because the coolant union is in the unopened, unpressurized condition.

If it is desired to operate the union 10 with liquid coolant, liquid coolant is operatively supplied through the fluid inlet port 43 via the fluid conduit 28' from source 11' and supplied through inlet port 44 via check valve 28b against closed check valve 28a and, thus, flows into the annular passageway 93 into the second sealing assembly 34 and into the axial passageway 42, through opening 42a therein and inlet 44. The portion of the pressurized coolant passing through the annular passageway 93 is directed to engage a shoulder portion 41 on the outer surface of the carrier 40 member, thereby applying a force to the carrier member. When the flow pressure of the liquid coolant becomes sufficient to overcome the bias force of the compression spring, the carrier 40 is moved by the force of the coolant flow to the operated, pressurized condition or position, to the left in FIG. 2, thereby moving the non-rotating seal member 38 into engagement with the rotating seal member 36, as illustrated in FIG. 8. When in the operated, pressurized condition, the liquid coolant flows through the passageway 42 in the housing 30, through the contacting seal members 36 and 38 of the floating seal assembly 32 and through the bore 17 in the stub rotor 18 to the rotating device to which coolant is to be supplied. As shown in FIGS. 8 and 9, when the carrier is moved to the operated engaging position, the O-ring seal 89 is moved into engagement with the slanting surface 96 of the back-up ring 91 and with the side wall 98 of the annular groove 92 of the second sealing assembly. The triangular shaped back-up ring 91 fills the space in the corner between the circular cross-sectioned O-ring seal 89 and the right angle adjacent side wall 98 and outer surface 76a of the carrier side wall 76 within the groove 91. Additionally, fluid through annular passageway 93 also enters the gap passageway 93a which balances the O-ring seal 89 positioned in the first sealing assembly 33. Thus, the primary sealing structure is provided by the second sealing assembly 34 when liquid coolant is directed into the coolant union.

The non-rotating seal member 38 is maintained in engagement with the rotating seal member 36 as long as fluid pressure flow is maintained through the coolant union. When the fluid pressure decreases to a value which is insufficient to overcome the force of the compression spring, the carrier 40 is moved under the force of the compression spring 86 thereby moving the seal member 38 out of engagement with the rotating seal member 36, returning the coolant union to its unoperated, unpressurized condition, the position as shown in FIGS. 2 and 3. The O-ring seal member 89 is moved by the carrier 40 back towards the said wall 99, the position shown in FIG. 3. The operation of a sealing arrangement for a liquid coolant union having a floating seal assembly is described and disclosed in my co-pending application, U.S. Ser. No. 390,490, filed on Feb. 17, 1995 and assigned to assignee of the present invention.

Thus, it has been shown that the present invention provides an improved sealing arrangement for preventing leakage between a portion of a seal assembly that is adapted for axial sliding movement within a throughbore of a housing and the inner wall of the housing of the coolant union along which the seal assembly portion slides. The seal arrangement includes an O-ring seal member located in an annular groove defined in the housing inner wall and a back-up ring carried by the carrier and extending into the groove. The O-ring seal is sized to be smaller than the annular groove. The back-up ring defines a slanting surface which faces the O-ring seal and which is engaged by the O-ring seal during axial movement of the seal assembly for limiting movement of the O-ring. The limited movement of the O-ring seals minimize wear on the seals, thereby increasing their lifetime.

The novel sealing arrangement or structure provided by the present invention is particularly suitable for application to rotating unions having both a second air actuated seal assembly and a second fluid actuated seal assembly in which the floating seal assembly, which is located within the housing of the union, provides a rotating seal between either an air inlet or a fluid inlet of the union and the discharge passageway of the rotor, as desired. The floating seal structure is adapted to be actuated either by an air coolant or a fluid coolant introduced into the inlet chamber for acting upon the non-rotating seal member to axially move it from an at rest first position, in the absence of a selected fluid or air flow pressure in the inlet chamber, to an operative second position and maintain it in the second position as long as the air fluid or fluid pressure is provided. In such applications, the sealing arrangement substantially prevents leakage forward between the engaging surface of the housing and the carrier that moves the non-rotating seal member into and out of engagement with the rotating seal member and prevents leakage between the rotating and non-rotating seal members.

Additionally, in accordance with the present invention the annular seal member or O-ring is structurally arranged to sealingly engage the outer annular surface of the movable portion of the seal assembly and to float within the annular groove provided in the inner wall of the housing. Thus, as thermal expansion of the spindle or shaft occurs during running of the rotating coolant union, this thermal expansion effects the preset opening distance between the rotating and non-rotating seal faces. Under such conditions, the O-ring never rolls on the movable portion of the seal assembly but instead is allowed to slide or float within the annular groove to provide an automatic adjustment for spindle expansion to maintain the preset opening distance and avoid contact during a dry running condition.

While the invention has been described with reference to preferred embodiments, various modifications can be made without departing from the spirit and scope of the invention as defined in the appended claims. For example, although the sealing arrangement is described with reference to an application in a fluid coupling device, and in particular a rotating coolant union, the sealing arrangement can be used in other applications in which sealing is required between first and second relatively movable members. Also, although in the exemplary embodiment, the annular groove is formed in the wall of the housing, the groove can be formed in the peripheral surface of the carrier and the inner surface of the housing can define a back-up surface that extends into such groove for controlling movement of the seal member.

I claim:

1. A coupling device for providing a sealing arrangement with a rotating seal member having a passageway therethrough comprising:

a housing having a fluid coolant inlet, an air coolant inlet and a passageway therethrough defining an inner surface, said housing structurally arranged in axial aligned position with the passageway of the rotating seal member;

a seal shaft member having a seal member thereon and an axial bore therethrough positioned in said housing for axial sliding movement within said passageway of said housing along said housing inner surface and said shaft member having an outer surface in engagement with said inner surface and operable between an unpressurized unsealed position and a pressurized sealed position, with said seal shaft member in said pressurized position providing a sealing arrangement between the rotating seal member and said seal shaft member;

a first sealing assembly positioned between said engaging surfaces of said seal shaft member and said housing and structurally arranged to communicate with said air coolant inlet when air coolant is directed through said axial bore of said seal shaft member to provide a seal between said shift member and said housing;

a second sealing assembly positioned between said engaging surfaces of said seal shaft member and said housing and structurally arranged to communicate with said fluid coolant inlet when fluid coolant is directed through said fluid coolant inlet to provide a seal between said shaft member and said housing;

first valve means positioned between said air coolant inlet and said source of air coolant and second valve means positioned between said air coolant inlet and said source of fluid coolant, with each of said first and said second valve means being operable between open and closed positions; and with said first sealing assembly providing a seal between said movable seal shaft member and said housing when air coolant is directed through said air coolant inlet into said housing when said first valve means is in the open position and said second valve means is in the closed position and said seal shaft member is in said pressurized position to provide said sealing arrangement between the rotating seal member and said shaft seal member and with said second sealing assembly providing a seal between said movable seal shaft member and said housing when liquid coolant is directed through said liquid coolant inlet and said air coolant inlet into said housing when said first valve means is in the closed position and said second valve means is in the open position and said seal shaft member is in said pressurized condition to provide said sealing arrangement between the rotating seal member and said seal shaft member.

2. The coupling device in accordance with claim 1, wherein each of said first and said second sealing assemblies include an annular seal member located in an annular groove defined in said inner surface of said housing, with said annular seal members engaging said shaft member.

3. The coupling device according to claim 2, wherein each of said annular grooves have first and second parallel sides which are spaced apart in a direction axially of said housing passageway, and wherein said annular seal member engages a side of said groove when said shaft member is at said pressurized position to provide a seal therebetween and floats within said groove when said shaft member is at said unpressurized position.

4. The coupling device in accordance with claim 2, wherein the width of each of said annular grooves in a direction axially of said passageway is greater than the outer diameter of said annular seal member for permitting said annular seal member to be moved within said groove in response to axial sliding movement of said shaft member within said housing and with at least said second sealing assembly including an annular back-up ring encircling said shaft member, said back-up ring having a radially projecting portion extending into said groove, said projecting portion of said back-up ring defining a slanting surface for a corner of the groove, the slanting surface facing said annular seal member and being engaged by said annular seal member during relative axial movement between said shaft member and said housing for limiting the movement of said annular seal member within said groove.

5. The coupling device according to claim 4, wherein said back-up ring is generally triangular in cross-section.

6. The coupling device according to claim 3, wherein each of said back-up rings have a central opening to facilitate the mounting of said back-up rings on said shaft member, the inner diameter of said opening being greater than the outer diameter of said shaft member to permit said back-up member to float on said shaft member.

7. The coupling device according to claim 2, wherein said annular seal member is an O-ring seal member.

8. The coupling device according to claim 7, wherein said groove is rectangular in cross-section and said O-ring seal member is circular in cross-section, whereby a space is provided between adjacent sides of said groove and said seal member, said space being substantially filled by said projecting portion of said back-up ring when said shaft member is in said pressurized position.

9. The coupling device according to claim 8, wherein the difference between said width of at least one said groove and said outer diameter of at least one said O-ring seal is approximately less than one millimeter.

10. The coupling device in accordance with claim 1, wherein when said second seal assembly is engaged by fluid coolant, the axial movement of said shaft member to the pressurized condition permitting said rotating seal member to be engaged by said shaft seal member to provide a seal therebetween.

11. The coupling device in accordance with claim 1, wherein when said first seal assembly is engaged by air coolant, the axial movement of said shaft member to the pressurize condition positions said shaft seal member within about 1–5 microns of said rotating seal member.

12. The coupling device in accordance with claim 1, wherein when said second seal assembly is engaged by fluid coolant, the axial movement of said shaft member to the pressurized condition positions said shaft seal member in contact with said rotating seal member.

13. The coupling device in accordance with claim 1, wherein said first sealing assembly is further structurally arranged to provide a seal between said movable shaft member and said housing when fluid coolant is directed through both said fluid coolant inlet and said air inlet port into said housing and the passageway therethrough.

14. The coupling device in accordance with claim 13, wherein a gap passageway is provided between said first and said second sealing assemblies to balance the pressure in said first sealing assembly during said pressurized condition.

* * * * *